United States Patent
Relyea, Jr. et al.

(10) Patent No.: US 10,108,970 B2
(45) Date of Patent: Oct. 23, 2018

(54) TARGETED ADVERTISING FOR DYNAMIC GROUPS

(75) Inventors: Donald H. Relyea, Jr., Dallas, TX (US); Brian F. Roberts, Dallas, TX (US); Alex Zavatone, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1738 days.

(21) Appl. No.: 12/410,588

(22) Filed: Mar. 25, 2009

(65) Prior Publication Data

US 2010/0250327 A1 Sep. 30, 2010

(51) Int. Cl.
*G06Q 30/00* (2012.01)
*G06Q 30/02* (2012.01)

(52) U.S. Cl.
CPC ......... *G06Q 30/02* (2013.01); *G06Q 30/0245* (2013.01); *G06Q 30/0255* (2013.01); *G06Q 30/0269* (2013.01)

(58) Field of Classification Search
CPC .............. G06Q 30/02; G06Q 30/0269; G06Q 30/0245; G06Q 30/0255
USPC ................. 705/14, 14.1, 14.49, 14.66, 14.67
See application file for complete search history.

(56) References Cited

U.S. PATENT DOCUMENTS

| | | | | |
|---|---|---|---|---|
| 6,133,912 A * | 10/2000 | Montero | ................ | G06Q 30/02 715/716 |
| 2002/0123928 A1 * | 9/2002 | Eldering et al. | ................ | 705/14 |
| 2003/0078972 A1 * | 4/2003 | Tapissier | ............. | H04L 12/1822 709/204 |
| 2003/0097301 A1 * | 5/2003 | Kageyama | ........ | G06F 17/30265 705/14.52 |
| 2003/0149975 A1 * | 8/2003 | Eldering et al. | ................. | 725/34 |
| 2003/0208754 A1 * | 11/2003 | Sridhar | .................. | G06Q 30/02 725/34 |
| 2004/0117831 A1 * | 6/2004 | Ellis | .................... | H04N 5/44543 725/53 |
| 2005/0204382 A1 * | 9/2005 | Ellis | ....................... | H04N 7/163 725/35 |
| 2006/0224447 A1 * | 10/2006 | Koningstein | .......... | G06Q 30/02 705/14.13 |
| 2006/0248209 A1 * | 11/2006 | Chiu et al. | .................... | 709/231 |
| 2006/0271959 A1 | 11/2006 | Jacoby et al. | | |
| 2007/0038516 A1 * | 2/2007 | Apple et al. | .................... | 705/14 |
| 2007/0233571 A1 * | 10/2007 | Eldering | ................ | G06Q 30/02 705/14.53 |
| 2007/0294126 A1 * | 12/2007 | Maggio | .......................... | 705/10 |
| 2008/0060002 A1 * | 3/2008 | Noll | ....................... | H04N 7/165 725/35 |

(Continued)

OTHER PUBLICATIONS

Official Journal EPO, "Notice from the European Patent Office dated Oct. 1, 2007 concerning business methods", pp. 592-593, Nov. 2007.

*Primary Examiner* — Luis A Brown

(57) ABSTRACT

A method performed by one or more devices within a subscription television network includes defining a micro-group, where the micro-group includes one or more user accounts associated with the subscription television network. The method further includes obtaining a profile for the micro-group and obtaining advertising corresponding to the profile of the micro-group. The method also includes sending the advertising to a device associated with one of the one or more user accounts.

20 Claims, 12 Drawing Sheets

(56) References Cited

U.S. PATENT DOCUMENTS

| | | | |
|---|---|---|---|
| 2008/0086741 A1* | 4/2008 | Feldman | G06Q 30/02 |
| | | | 725/13 |
| 2008/0091692 A1* | 4/2008 | Keith | G06F 17/3089 |
| 2008/0181225 A1* | 7/2008 | Zampiello | H04L 12/1859 |
| | | | 370/390 |
| 2008/0215607 A1* | 9/2008 | Kaushansky | G06F 17/30867 |
| 2008/0259906 A1* | 10/2008 | Shkedi | 370/352 |
| 2008/0276270 A1* | 11/2008 | Kotaru | H04N 21/252 |
| | | | 725/34 |
| 2009/0019485 A1* | 1/2009 | Ellis et al. | 725/40 |
| 2009/0037252 A1* | 2/2009 | Joyce | G06Q 30/02 |
| | | | 705/7.32 |
| 2009/0112690 A1* | 4/2009 | Brady | G06Q 30/02 |
| | | | 705/7.33 |
| 2009/0119590 A1* | 5/2009 | Kondziela | G06F 8/38 |
| | | | 715/716 |
| 2009/0249401 A1* | 10/2009 | Squedin | H04N 7/173 |
| | | | 725/46 |
| 2010/0250327 A1* | 9/2010 | Relyea, Jr. | G06Q 30/02 |
| | | | 705/14.53 |
| 2011/0022519 A1* | 1/2011 | Pan | G06Q 30/02 |
| | | | 705/51 |

* cited by examiner

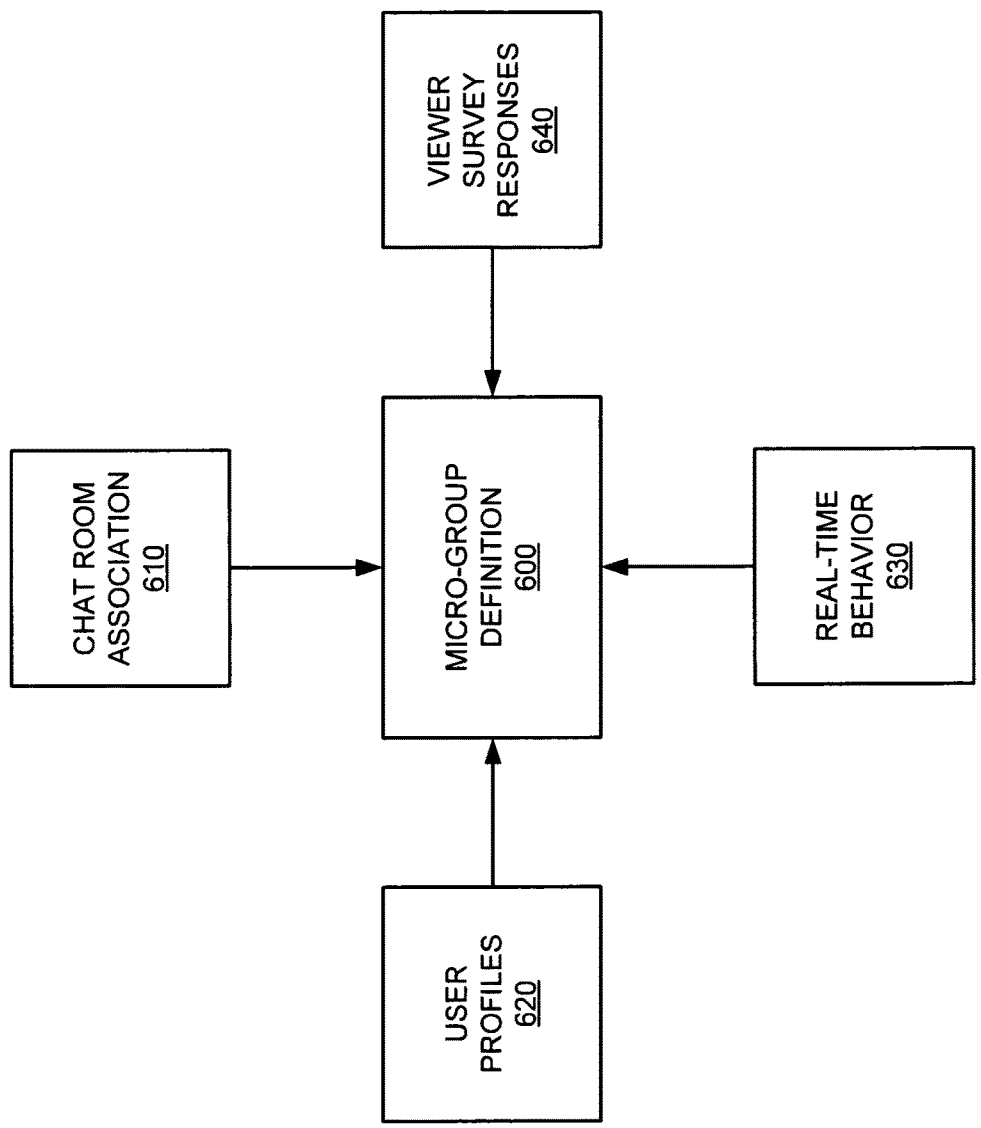

TARGETED ADVERTISING FOR DYNAMIC GROUPS

BACKGROUND INFORMATION

Target advertising typically seeks to generate improved customer response rates by directing particular advertisements to consumers based on observed behavior. Television service providers that can simultaneously direct a variety of advertisements to smaller similarly-interested groups may be poised to generate more revenue than those using a single advertisement to all viewers watching the same program.

BRIEF DESCRIPTION OF THE DRAWINGS

FIG. 6 is a diagram of exemplary factors for identifying a micro-group;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may allow a subscription television service provider to define micro-groups of users and identify micro-group tendencies to provide targeted advertising to members of the micro-group. As used herein, the term "micro-group" may refer to a group of subscribers to the subscription television service that are associated by an expressed interest. The micro-group may be created based on a variety of techniques, including social networking (e.g., chat group participation, accepting an invitation as a group member, etc.), past viewing histories, and/or real-time viewing behavior. In some implementations, the micro-group tendencies may change dynamically as different users join or leave the micro-group. Implementations described herein may be incorporated using a television display and video client (e.g., a set-top box), a personal computer, a mobile telecommunications device, and/or combinations thereof.

As used herein, the term "video client" may refer to any media processing device that may receive multimedia content over a network, and may provide such multimedia content to an attached video display device (such as a television or monitor). Also, the term "advertisement," as used herein, may refer to any multimedia content, such as video, audio, images, and/or text, that can be streamed or downloaded for presentation to a viewer. Also, as used herein, the terms "viewer," "user," "subscriber," and "customer" may refer interchangeably to a person who interacts with, orders, views, listens to, or plays a multimedia content provided by a subscription television service.

Figure 1:
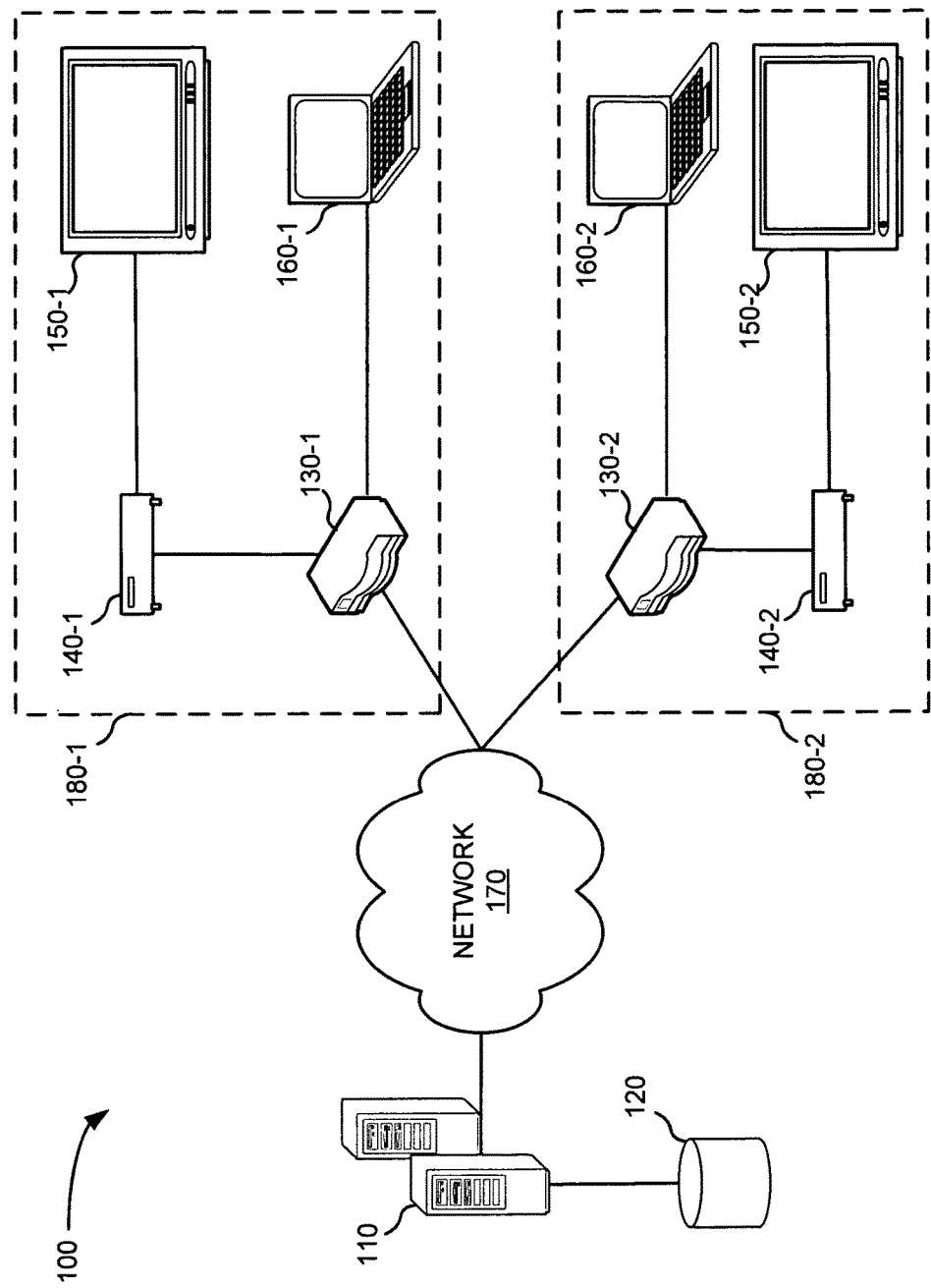
FIG. 1 depicts an exemplary network in which systems and/or methods described herein may be implemented.

FIG. 1 is a diagram of an exemplary network 100 in which systems and/or methods described herein may be implemented. As illustrated, network 100 may include server devices 110, a database 120, gateways 130-1 and 130-2 (herein referred to collectively as "gateways 130" and generically as "gateway 130"), video clients 140-1 and 140-2 (herein referred to collectively as "video clients 140" and generically as "video client 140"), video display devices 150-1 and 150-2 (herein referred to collectively as "video display devices 150" and generically as "video display device 150"), computing devices 160-1 and 160-2 (herein referred to collectively as "computing devices 160" and generically as "computing device 160"), and a network 170. Gateways 130, video clients 140, video display devices 150 and computing devices 160 may be located on a customer's premises, such as customer premises 180-1 and 180-2. Customer premises 180-1 and 180-2 may be connected via network 170 to server devices 110 at, for example, a subscription television service provider's premises. Components of network 100 may interconnect via wired and/or wireless connections.

For simplicity, one set of server devices 110, one database 120, one network 170, and two customer premises 180 have been illustrated in FIG. 1. In practice, there may be more server devices, databases, networks, and/or customer premises. Also, each of customer premises 180 may contain additional, fewer, different or differently arranged devices than shown in FIG. 1. Furthermore, in some instances, one or more of the components of network 100 may perform one or more functions described as being performed by another one or more of the components of network 100.

In general, server devices 110 may provide control over (e.g., via network 170) television services for devices, such as video display devices 150 and/or other network connectivity devices (e.g., Internet and telephone, not shown) provided at the customer's premises. As further shown in FIG. 1, server devices 110 may connect to a database 120 to store and/or retrieve customer data.

Server devices 110 may include servers or other network devices used to deliver or control delivery of the telecommunication services to customer premises 130. For example, server devices 110 may include web servers, network switches or routers, television broadcast facilities, etc. Examples of server devices 110 may include a headend device that provides broadcast television programs, a video-on-demand (VOD) device or other device that provides multimedia content upon request, and a program guide information server that provides information related to multimedia content available to customer premises 180. Server devices 110 may also receive information from one or more video clients 140 and/or computing devices 160, such as recorded information that may include viewing histories tracked by video client 140. Server devices 110 may store the information from the video clients in, for example, a database, such as database 120.

In implementations described herein, server devices 110 may include one or more entities that are capable of performing statistical analysis on data stored, for example, in database 120. Server devices 110 may retrieve data from database 120 to analyze the data and combine related data into micro-groups of user accounts based on pattern analysis and correlation. Server devices 110 may also receive and/or apply criteria to implement target advertising for the micro-groups. In one exemplary implementation, server devices 110 may apply various criteria to associate a micro-group with a selection of advertisements that correspond to interests of the micro-group. While shown as a single set of servers in FIG. 1, in other implementations, server devices 110 may be combined as a single server or distributed among multiple sets of servers.

Database 120 may include one or more memory devices that maintain advertising information and entries relating to subscribers' viewing histories. For example, database 120 may include advertising-related data, such as advertisement categories (e.g., product types, related products, product costs, presentation styles (e.g., humor, statics-based, celebrity-endorsed, etc.). Database 120 may also store information that server devices 110 receive from one or more video clients (e.g., video clients 140), computing devices (e.g., computing devices 160), or other device(s) that communicates viewer activities. In one implementation, database 120 may include exemplary fields, such as a user-identification field, a date field, a time field, a channel field, and/or a program identification field. While only one database is shown in FIG. 1, database 120 may include multiple databases stored locally at one of server devices 110 and/or stored at one or more different and possibly remote locations. Database 120 may group customers' viewing history by users and/or user groups and/or by program (e.g., to track program popularity). Database 120 may maintain additional or different information relating to programs watched, recorded, and/or ordered by viewers.

Gateway 130 may include a network device that provides an interface from network 170 to video clients 140, computing devices 160, and other network connectivity devices (not shown). For example, when telecommunication services are provided to the customer's premises via an optical fiber, gateway 160 may include an optical network terminal (ONT) that connects to the optical fiber. The ONT may convert between signals appropriate for video display device 150 and signals appropriate for transmission over optical fiber. For example, the ONT may include a coaxial cable connection that leads to video display device 150 or video client 140. The ONT may also include an Ethernet output port that connects to a personal computer or a VoIP telephone and/or a standard telephone port for connecting to a standard telephone.

Gateway 130 may include one of a number of possible gateway devices, including a satellite antenna and receiver, a coaxial cable connection, an ONT, or a broadband access for Internet Protocol TV (IPTV). The satellite antenna and receiver may provide an interface for television service broadcast from satellites. The coaxial cable connection may provide an interface for television service connected to a customer via coaxial cables. The ONT may provide an interface for an optical fiber connection. The broadband IPTV access may generally include any device that provides broadband access over which television service may be provided.

Video client 140 may include a device for selecting and/or obtaining content that may be shown or played on video display device 150. Examples of video client 140 may include a set-top box, a computer, a cable card, and a portable electronic device. Video client 140 may receive a television signal from gateway 130, may convert the signal to a form usable by video display device 150, and may transmit the signal to video display device 150 for display. Video client 140 may further allow a user to alter the programming provided to video display device 150 based on a signal (e.g., a channel up or channel down signal) from, for example, a remote control (not shown). Video client 140 may also be capable of sending data to server devices 110. In some implementations, video client 140 may be incorporated into video display device 150, such as a television, a computer, or a portable electronic device.

Video display device 150 may include a digital or analog display via which a user may view VOD programs. Video display device 150 may refer to any device that can receive and display multimedia content delivered over network 170 for perception by users. Video display device 150 may include technologies, such as cathode ray tube (CRT) displays, liquid crystal displays (LCDs), light-emitting diode (LED) displays, plasma displays, etc.

Computing device 160 may include, for example, a personal computer, such as desktop, laptop computer, personal digital assistant (PDA), etc., used for general computing tasks. In some implementations, computing device 160 may be configured to receive and display television programming (e.g., IPTV). Computing devices 160 may also be used by users to access accounts with Internet service providers (ISPs) to send/receive content over network 170.

Network 170 may include a local area network (LAN), a wide area network (WAN), such as a cellular network, a satellite network, a fiber optic network, or the Internet, a private WAN, or a combination of the Internet and a private WAN, etc. that is used to transport data. Although shown as a single element in FIG. 1, network 170 may include a number of separate networks that function to provide services to customer premises 180. In one implementation, network 170 may terminate at customer premises 180 via an optical communication link, such as an optical fiber provided to customer premises 180. In another possible implementation, network 170 may terminate at customer premises 180 via a coaxial cable. In still another implementation, network 170 may terminate at customer premises 180 via a wireless (e.g., satellite) connection.

In one implementation, video client 140 and/or computing device 160 may track information relating to programs viewed by customers (or stored to other devices (not shown), such as a video cassette recorder (VCR), a digital video recorder (DVR), an external storage device, or a remote streaming video viewing device). Using network 170, video client 140 and/or computing device 160 may provide some or all of the tracked program viewing/recording information to a server, such as one of server devices 110. Video client 140 and/or computing device 160 may obtain tracked program viewing/recording information from an internal memory and/or from server devices 110.

In implementations described herein, server devices 110 may define micro-groups of user accounts associated with network 100. Server devices 100 may use the received viewing history data from video clients 140 and/or computing devices 160 to define user account profiles and store the data in database 120. Using the user account profiles, server devices 110 may identify a profile for the micro-group and obtain advertising corresponding to the profile of the micro-group. Server devices 110 may then send the advertising to video clients 140 and/or computing devices 160 associated with the user accounts in the micro-group.

Figure 2:
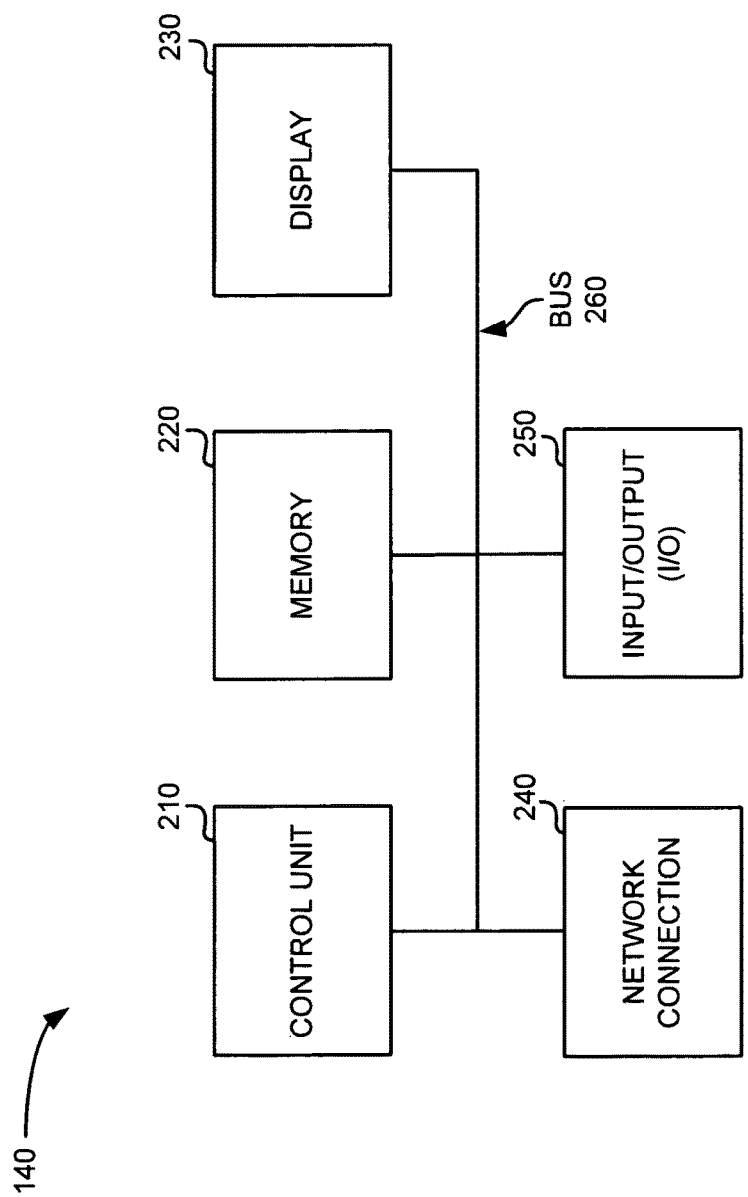
FIG. 2 is a block diagram of exemplary components of a video client that may be used in the network of FIG. 1.

FIG. 2 is diagram illustrating exemplary components of video client 140. As shown, video client 140 may include a control unit 210, a memory 220, a display 230, a network connection 240, an input/output (I/O) component 250, and a bus 260.

Control unit 210 may include a processor, microprocessor, or another type of processing logic that interprets and executes instructions. Among other functions, control unit 210 may collect and store viewer activity associated with television programming. Control unit 210 may execute instructions to send viewing history information to another device, such as server devices 110. Control unit 210 may also receive information and/or instructions from other devices, such as server devices 110.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store viewing history information to send at a later point in time, such as when requested by server devices 110, at a particular interval, or as viewing events occur.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information. Display 230 may be an optional component.

Network connection 240 may include any transceiver-like mechanism that enables video client 140 to communicate with other devices and/or systems. For example, network connection 240 may include an Ethernet interface, an optical interface, a coaxial interface, a radio interface, or the like. Network connection 240 may allow for wired and/or wireless communication. Network connection 240 may be configured to connect video client 140 to a packet-based IP network.

Input/output devices 250 may generally include user input devices such as external buttons, and output devices, such as LED indicators. With input/output devices 250, a user may generally interact with video client 140. In some implementations, input/output devices 250 may be implemented via a remote control. A remote control may include a range of devices including function specific keys, number keys, and/or a full-text key pad. Bus 260 may provide an interface through which components of video client 140 can communicate with one another.

As will be described in detail below, video client 140 may perform certain operations relating to recording and communicating a history of viewer activities to a server, such as server devices 110. Video client 140 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of video client 140, in other implementations, video client 140 may include fewer, additional, different and/or differently arranged components than those depicted in FIG. 2. In still other implementations, one or more components of video client 140 may perform one or more other tasks described as being performed by one or more other components of video client 140.

Figure 3:
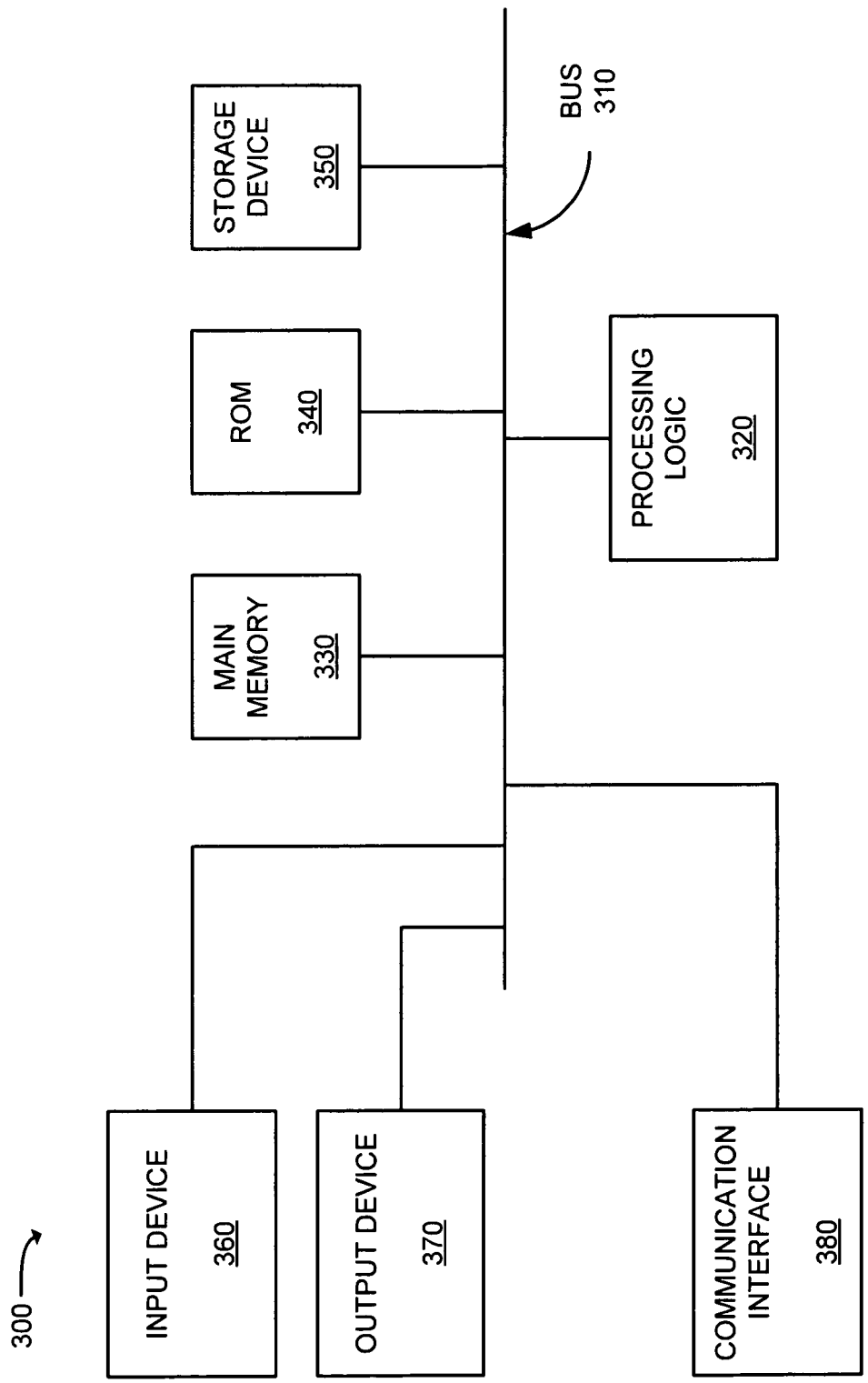
FIG. 3 is a block diagram of exemplary components of a device that may correspond to the backend server of FIG. 1.

FIG. 3 is a diagram of exemplary components of a device 300 that may correspond to any of server devices 110 and/or computing device 160. As illustrated, device 300 may include a bus 310, processing logic 320, a main memory 330, a read-only memory (ROM) 340, a storage device 350, an input device 360, an output device 370, and a communication interface 380.

Bus 310 may include a path that permits communication among the components of device 300. Processing logic 320 may include a processor, microprocessor, or other type of processing logic, such as an application-specific integrated circuit (ASIC), field-programmable gate array (FPGA), etc., that may interpret and execute instructions.

Main memory 330 may include a RAM or another type of dynamic storage device that stores information and instructions for execution by processing logic 320. ROM 340 may include a ROM device or another type of static storage device that may store static information and instructions for use by processing logic 320. Storage device 350 may include a magnetic and/or optical recording medium and its corresponding drive. In one implementation, storage device may include database 120.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as video client 140.

As will be described in detail below, device 300 may perform certain operations associated with providing targeted advertising for a subscription television service. Device 300 may perform these and other operations in response to processing logic 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, additional, different, and/or differently arranged components than those depicted in FIG. 3. In still other implementations, one or more components of device 300 may perform one or more other tasks described as being performed by one or more other components of device 300.

Figure 4:
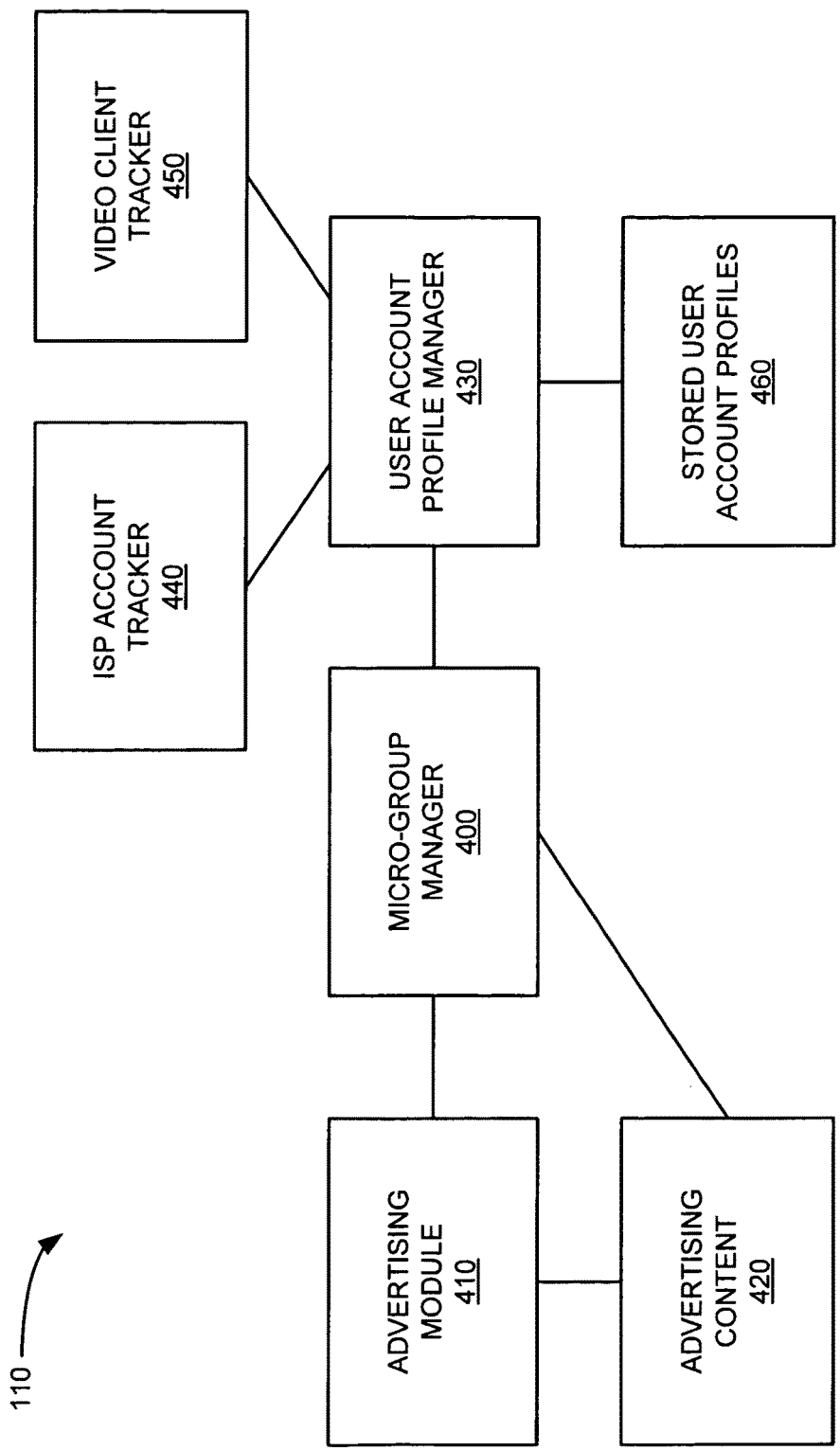
FIG. 4 is a diagram of exemplary functional components of a server device of FIG. 1.

FIG. 4 provides a diagram of exemplary functional components of server devices 110. As shown, server devices 110 may include a micro-group manager 400, an advertising module 410, advertising identifiers 420, a user account profile manager 430, an Internet service provider (ISP) account tracker 440, a video client tracker 450, and stored user account profiles 460. Depending on the implementation, server devices 110 may include additional, fewer, different, or differently arranged components than those illustrated in FIG. 4.

Micro-group manager 400 may include a component for managing directed advertising to a micro-group. For example, micro-group manager 400 may define and/or track micro-groups based on customer interactions, such as chat group participation and/or user account profile information. Micro-group manager 400 may identify micro-group tendencies based on user account profile information obtained from, for example, user account profile manager 430. Micro-group manager 400 may also request advertising from advertising module 410 that matches the micro-group traits or tendencies. In one implementation, micro-group manager may direct the advertising to members of the micro-group. When users join/leave the micro-group, micro-group manager 400 may recalculate the micro-group profile (or request another functional component to recalculate the micro-group profile). Users may be considered to join/leave a micro-group, for example, when they stop receiving programming (e.g., turn off their television/computer), log out of a chat group or account session, etc.

Advertising module 410 may include a component for matching advertising content to micro-group tendencies. For example, advertisements may be assigned a unique advertising identifier that may be cross-referenced to particular demographics, interests, or other indicators that may be obtained from a micro-group. Advertisers may classify particular advertising content to identify demographic groups, common interests, and/or other information that can be used in determining particular viewers (or groups of viewers) to direct the advertising content to. Advertising module 410 may receive micro-group tendencies from micro-group manager 400 and retrieve advertising content that has been classified to correspond to the identified micro-group tendencies.

Advertising content 420 may include advertising content and/or links to advertising content that may be retrieved by advertising module 410 and/or micro-group manager 400. Advertising content 420 may include multiple advertising formats, such as video (analog and/or digital), images, text, etc. Advertising content may include advertising for third-party products and/or advertising from the subscription television provider (e.g., for premium channels, VOD, or PPV offers). Advertising may be configured to be integrated into a designated time slot within a television program (e.g., a traditional commercial break in a program schedule) or may be configured to be displayed simultaneously with a television program (e.g., in a dedicated advertising space adjacent to a television program display).

User account profile manager 430 may include a component for collecting user data from ISP account tracker 440, video client tracker 450, and/or stored user account profiles 460. User account profile manager 430 may determine viewer tendencies based on the user data and create a user account profile for individual users and/or groups of users with common tendencies. User account profile manager 430 may build tendency profiles for each of the user groups, so that each of the tendency profiles include predicted actions for users within each of the groups. User account profile manager 430 may store tendency profiles, for example, in stored user account profiles 460.

ISP account tracker 440 may include a component for retrieving user data from one or more computing devices (e.g., computing device 160) or ISP account. In one implementation, computing devices 160 may track information relating to content requested by and/or provided to computing device 160 associated with a users ISP account. In other implementations, ISP account tracker 440 may monitor information sent to a particular user account. Tracked content may include, for example, internet sites visited, downloads from particular service providers, streaming video and/or other multimedia content.

Video client tracker 450 may include a component for retrieving user data from one or more video clients (e.g., video client 140). In one implementation, video clients 140 may track information relating to programs provided to display device 150 or other devices, such as a video cassette recorder (VCR), a digital video recorder (DVR), external storage device, or a remote streaming video viewing device. Video client 140 may provide some or all of the tracked program viewing information to video client tracker 450. Tracked program viewing information may include, for example, programs watched, orders for premium programs (e.g., video-on-demand, pay-per-view, games, and the like), program guide searches, etc.

Stored user account profiles 460 may include information from ISP account tracker 440 and/or video client tracker 450 that may be categorized by each user. The information from ISP account tracker 440 and/or video client tracker 450 may be stored, for example, in database 120.

Figure 5:
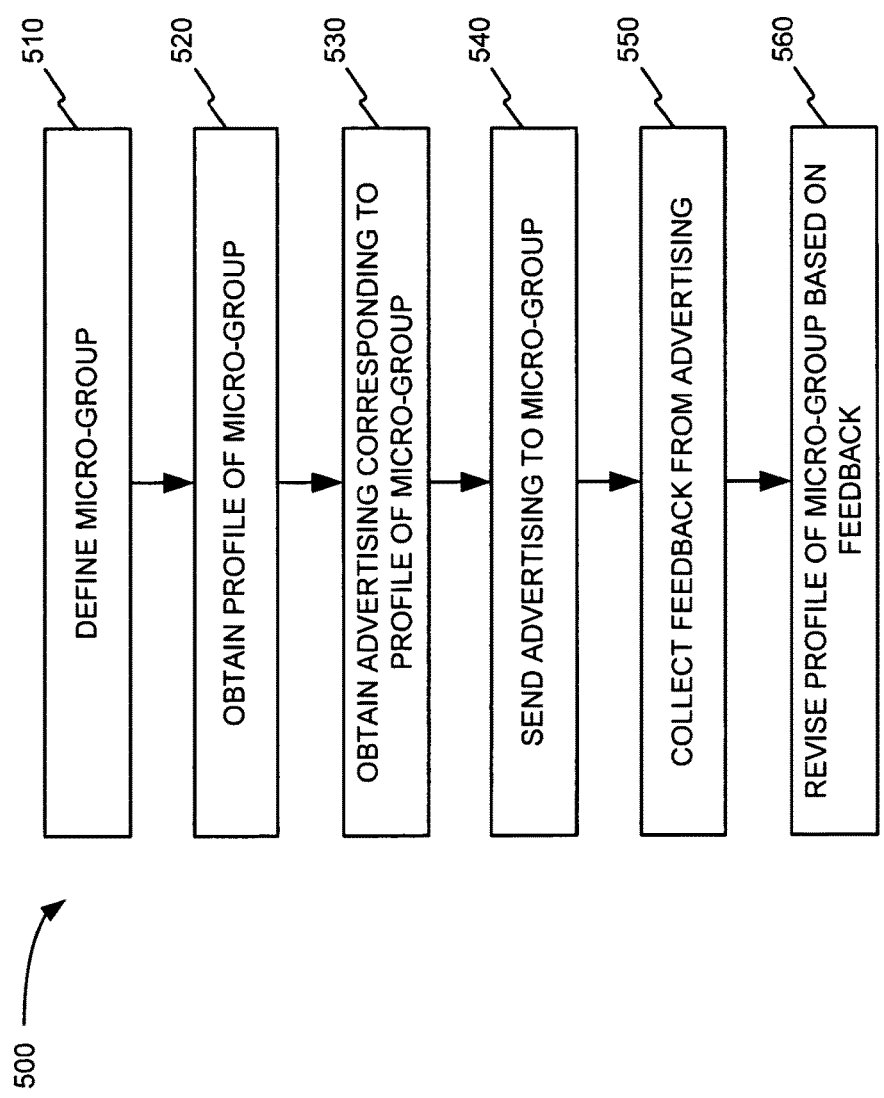
FIG. 5 is a process flow illustrating exemplary operations to offer targeted advertising to micro-groups.

FIG. 5 provides a process flow 500 illustrating exemplary operations to offer targeted advertising to micro-groups. The operations may be performed by one or more servers associated with a subscription television service and/or ISP, such as server devices 110. In some implementations, certain operations may also be performed by one or more video clients 140 and/or computing devices 160.

Process 500 may begin with defining a micro-group (block 510). A micro-group may be defined, for example, based on a variety of factors including, for example, chat room associations, user profiles, user behavior, and/or express user input. In implementations described herein, a micro-group may include a collection of user accounts. User accounts may be associated with the subscription television network either through a video client (e.g., video client 140) or through another account that can be associated with a particular video client (e.g., an account with an ISP that is linked to an account with the subscription television network). In some implementations, an ISP account and a subscription television account may be linked together with a singe user account profile for both accounts. Micro-group criteria are described further with respect to FIG. 6.

FIG. 6 is a diagram of exemplary criteria provided to define a micro-group. Micro-group definition 600 (which may be compiled, for example, within micro-group manager 400) may incorporate chat room association 610, user profiles 620, real-time behavior 630, and/or view survey responses 640 to determine a particular micro-group.

Chat room association 610 may include user accounts that are voluntarily associated for real-time or near-real time text-based discussion. For example, users may participate in a chat group to discuss a particular television program. Chat rooms may be hosted by one or more servers (e.g., server devices 110) associated with a subscription television service or in communication with the subscription television service. Chat room associations may be made when a user invites one or more other users to enter a chat room. In some implementations, user chat room interaction may be accomplished using a video client. In other implementations, user chat room interaction may be accomplished using a computing device separate from the video client. In still other implementation, user chat room interaction may be accomplished using a combination of a video client and a separate computing device.

User profiles 620 may include information for individual user accounts, such as information from video clients 140, ISP accounts, and/or combinations of video client 140 and ISP account information. For example, server devices 110 (e.g., video client tracker 450) may collect viewer history information from various video clients, such as video clients 140. Video clients 140 may identify particular viewer actions (e.g., programs watched, searches performed, and/or programs ordered) and provide data over a network (e.g., network 170) to server devices 110. Server devices 110 (e.g., user account profile manager 430) may compile and sort the collected viewer history information locally and/or in a database, such as database 120. Server devices 110 may identify groups of video clients 140 based on the viewer history and program content information. User profiles 620 may indicate of interest in a particular category that matches a particular advertising content. For example, a user profile may indicate a preference for health and fitness programs on standard television channels and that preference may be weighted toward advertising for nutritional supplements regardless of whether a user is currently watching a fitness-related program.

Real-time behavior 630 may include behavior of individual users within a micro-group. For example, real-time behavior may include actions to join/leave a chat room. The addition/subtraction of one or more users to a micro-group may alter the overall profile for the micro-group, effectively altering the type of advertising that may be targeted toward the micro-group. Real-time behavior may also include user responses to particular advertising, including, for example, forwarding advertising links to other users.

User survey responses 640 may include inputs from a user to actively create a user profile. For example, a subscription television service provider may solicit user input to determine user preferences. Surveys may be conducted, for example, via a telephone calls, email surveys, on-line responses, etc. In one implementation, information from surveys may be recorded and later associated with a user profile.

The criteria to define a micro-group may be applied to individual customers, subsets of customers, or all customers. Thus, micro-group sizes may range from a single user to thousands of users. Criteria for chat room association 610, user profiles 620, real-time behavior 630, and/or view survey responses 640 may be used individually or in combination to determine define a micro-group.

Referring back to FIG. 5, once a micro-group is defined, a profile may be obtained for the micro-group (block 520). For example, micro-group manager 400 may request a micro-group profile from user account profile manager 430. In one implementation, the micro-group profile may include common traits among the individual user accounts.

Advertising that corresponds to the profile of the micro-group may be obtained (block 530). For example, micro-group manager 400 may identify profile tendencies, categories, trends, etc. of the micro-group and request advertising module 410 to identify advertising that matches any of those tendencies, categories, trends, etc. Advertising module 410 may match the profile for the micro-group with advertising classifications that may be associated with each advertisement. Advertising module 410 may identify advertising content that may be retrieved from advertising content 420.

Advertising may be sent to the micro-group (block 540). For example, one or more of server devices 110 (using, e.g., micro-group manager 400) may send the advertising that corresponds to the profile of the micro-group. Depending on the type of advertising, the advertising may be sent to a computing device 160 or a video client 140 for eventual presentation to a user in the micro-group. The advertising may be presented, for example, in designated advertising space on a display screen, as a pop-up window or overlay, during a designated time slot, as a click-through window, etc.

Feedback from the advertising may be collected (block 550). For example, server devices 110 (e.g., ISP account tracker 440 and/or video client tracker 450) may receive user data collected from computing devices 160 and/or video clients 140. The user data may include user feedback based on the targeted advertising, such as clicking on a link in an advertisement or conducting a search using an advertised term within a certain period of the advertisement display.

The profile of the micro-group may be revised based on the feedback (block 560). For example, server devices 110 (e.g., user account profile manager 430) may adjust tendency profiles for each of the user groups based on the data received from computing devices 160 and/or video clients 140. User account profile manager 430 may store the updated tendency profiles, for example, in stored user account profiles 460.

Figure 7A:
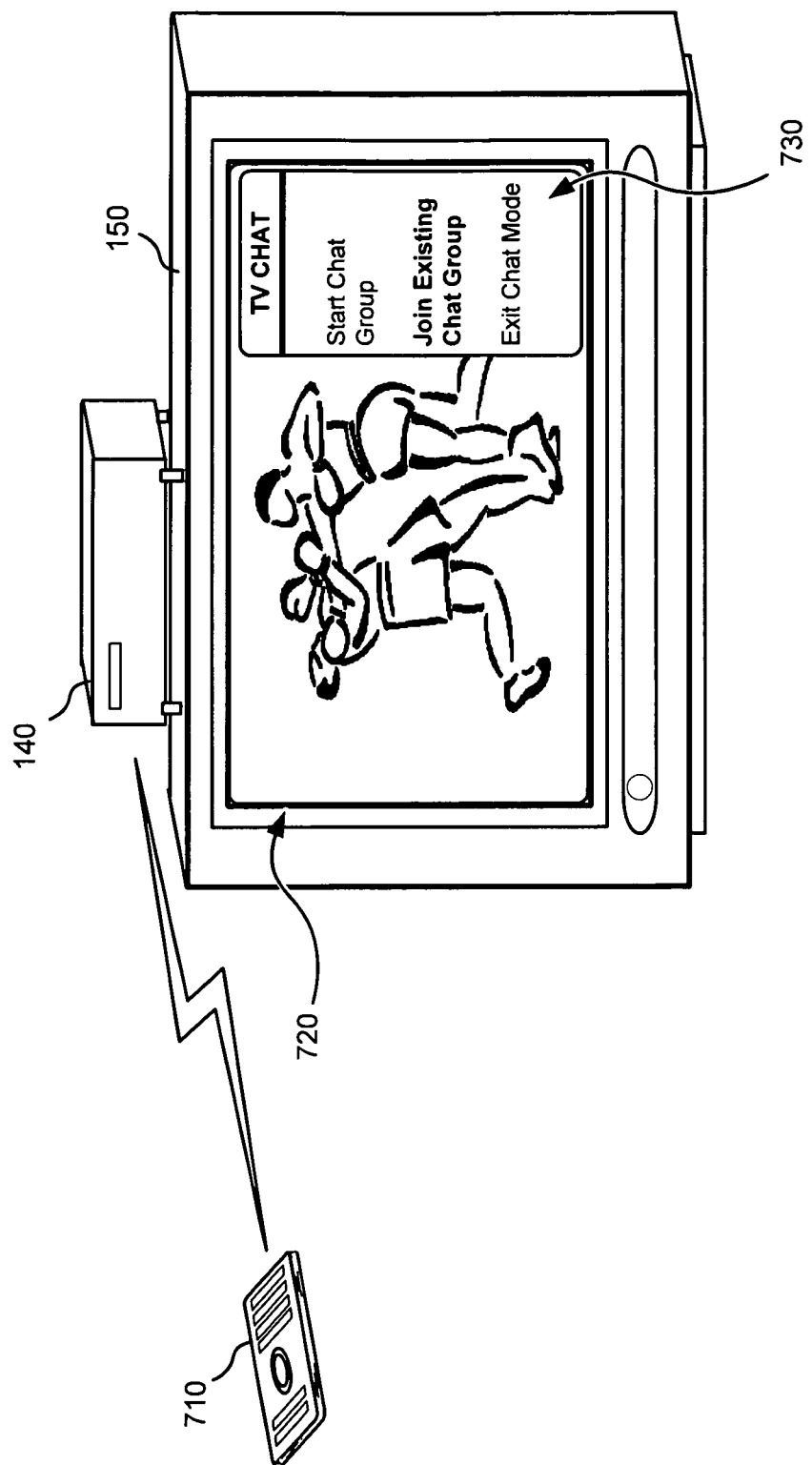
FIGS. 7A-7D are exemplary diagrams illustrating implementations of television-based customer interfaces for a chat-based micro-group.
Figure 7B:
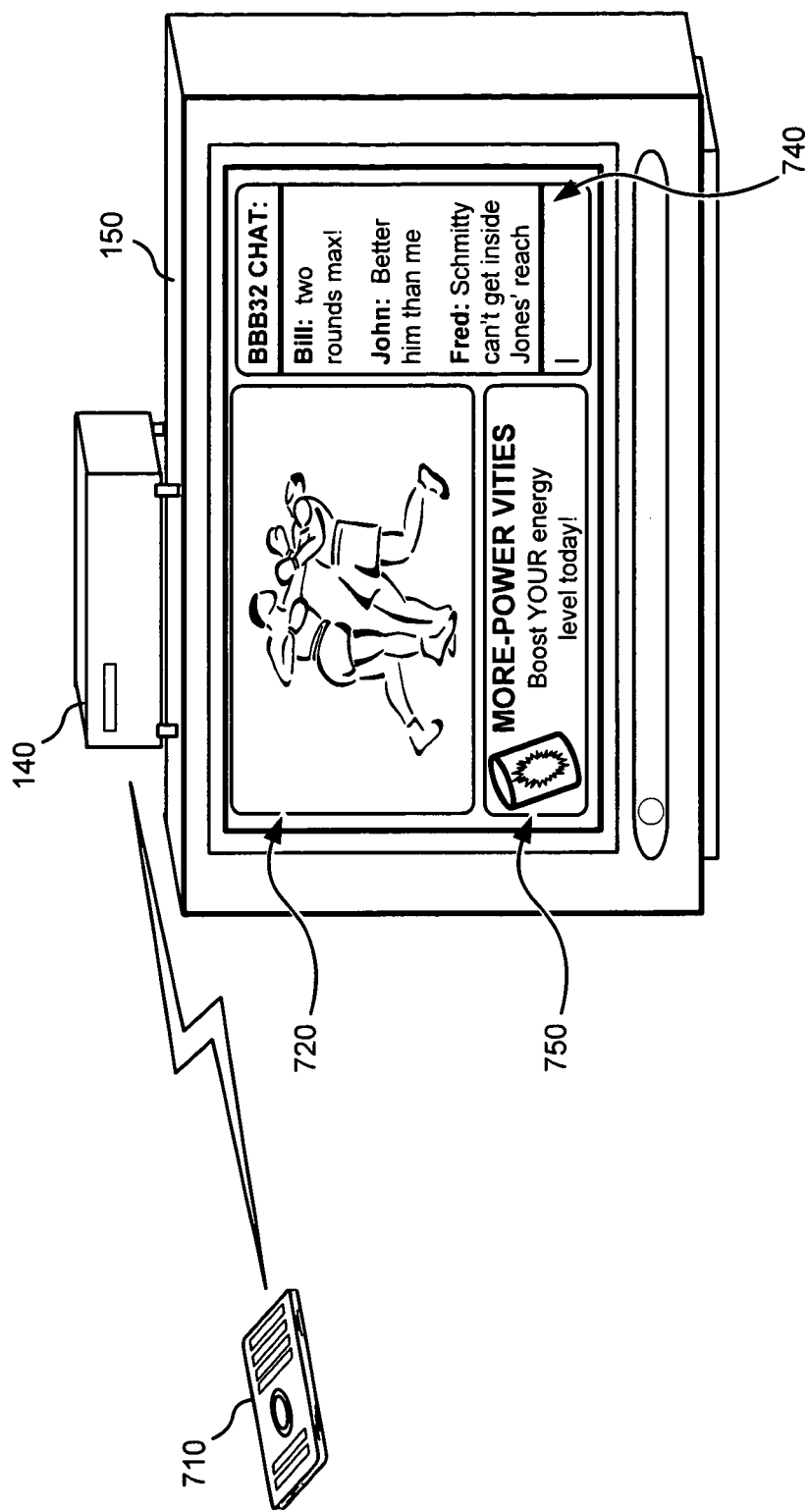
Figure 7C:
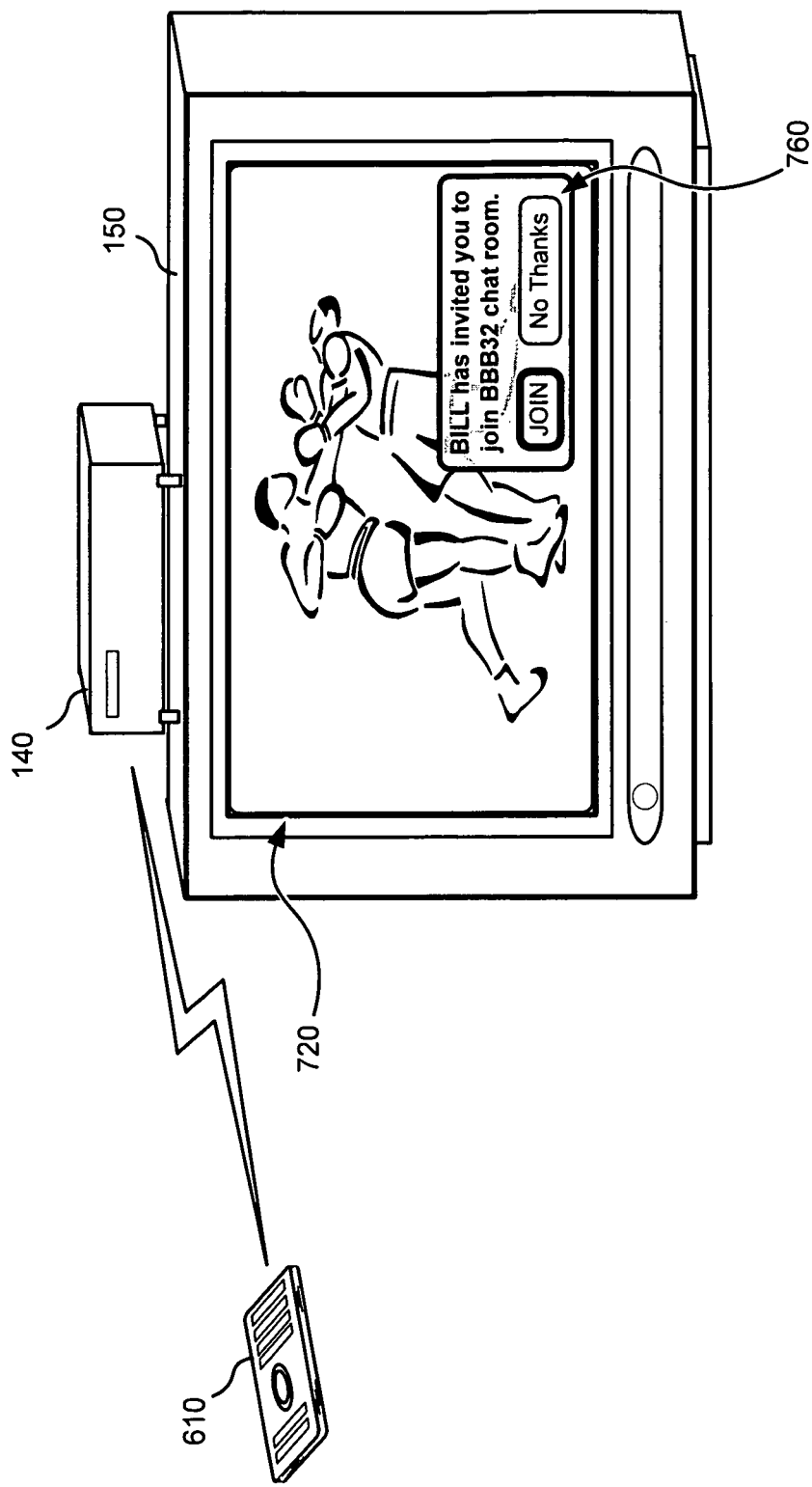
Figure 7D:
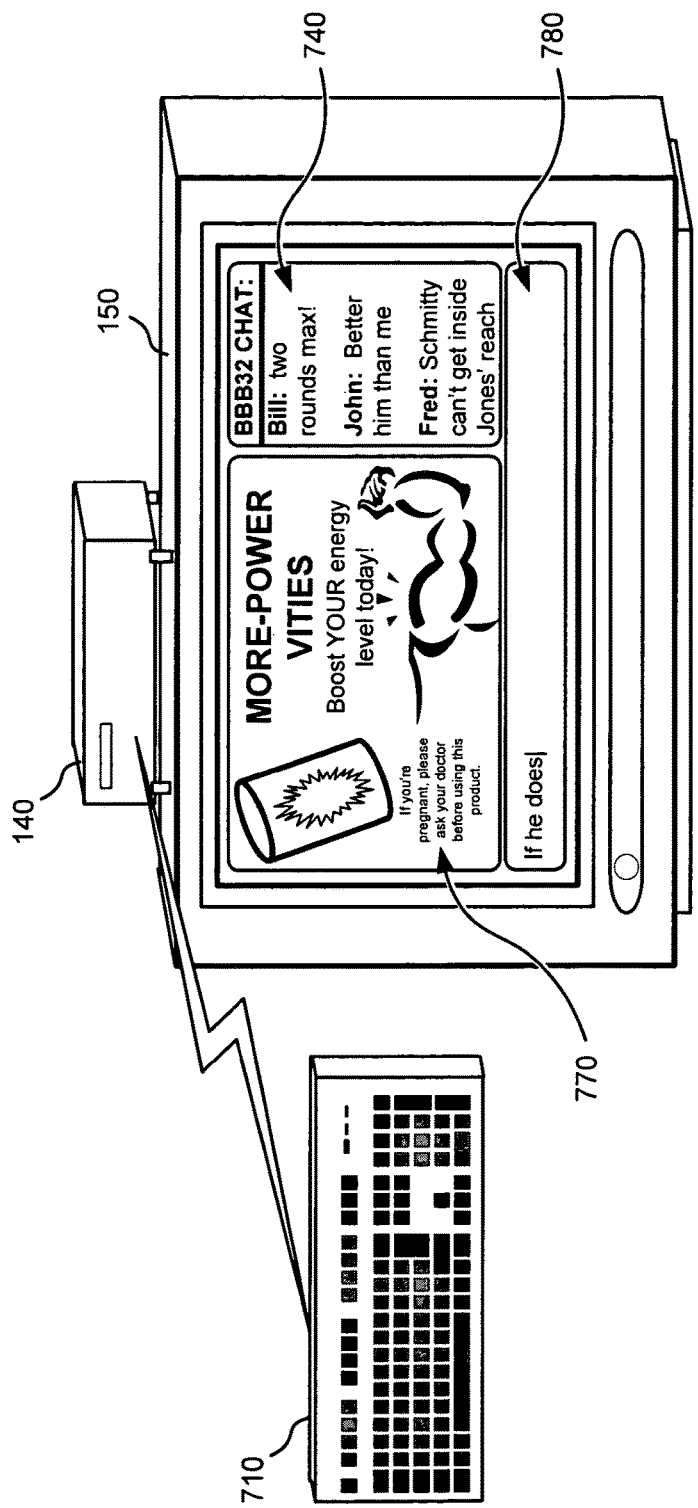

FIGS. 7A-7D provide exemplary diagrams illustrating implementations of television-based customer interfaces for a chat-based micro-group. FIG. 7A provides an exemplary diagram of a program screen that includes a chat mode entry window. FIG. 7B provides an exemplary diagram of a chat group screen presentation with dedicated advertising space. FIG. 7C provides an exemplary diagram of a program screen that includes a chat mode invitation window. FIG. 7D provides an exemplary diagram of a chat group screen presentation that does not include a dedicated advertising space.

Referring to FIG. 7A, a user may view a program on display device 150. Program content (e.g., any multimedia content) may be provided to the display device via video client 140, and the user may select desired program content (e.g., select a channel to view) via remote control 710 or other control buttons on video client 140. The multimedia content 720 may be displayed on device 150.

A user may wish to collaboratively watch the broadcast program content 720 with a select group of remote friends by establishing a chat session. Using remote control 710, the user may cause video client 140 to present a chat mode window 730 on display device 150. In one implementation, remote control 710 may include a dedicated button to initiate a chat mode in video client 140. In other implementations, the chat mode may be selected from a menu-based application. When the user selects (via remote control 710) an option from chat mode window 730, video client 140 may present to the user with various options. For example, selecting "Start Chat Group" from chat mode window 730 may allow a user to select from a group of contacts to invite. Each contact selected by the user may be sent an invitation to join the chat group. Selecting "Join Existing Chat Group" may allow a user to select from a list of chat groups that may already be in progress. Selecting "Exit Chat Mode" may remove chat mode window 730 from view. If a user selects either "Start Chat Group" or "Join Existing Chat Group,"

video client 140 may provide the selection information to server devices 110 to associate the user with a micro-group (e.g., the group of users forming the chat group).

If the user selects "Join Existing Chat Group" in chat mode window 730, the exemplary chat group screen of FIG. 7B may be shown to the user. The chat group screen in FIG. 7B may include a multi-panel display that has program content 720, chat space 740, and dedicated advertising space 750. In the exemplary implementation of FIG. 7B, the size of program content 720 window may be reduced from a full-screen while maintaining the original aspect ratio, thus creating display space for chat space 740 and dedicated advertising space 750.

Chat space 740 may include dialogue text of friends in the chat group (e.g., Bill, John, and Fred). In one implementation, chat space 740 may include space for user input which may be provided via remote control 710 (or another remote control device that includes text-entry capabilities). In other implementations, user input for the chat group may be provided to server devices 110 via a separate device (e.g., computing device 160, a text-enabled device, or other device) and sent to video client 140 (e.g., via network 170) for display in chat space 740.

Dedicated advertising space 750 may include advertising content that has been identified (e.g., by micro-group manager 400) as applicable to the chat room participants. Dedicated advertising space 750 may include digital and/or analog presentations that may change at certain time intervals and/or when a presence indication (e.g., a signal from a remote control, text entry, etc.) is received from a user.

If the user selects "Start Chat Group" in chat mode window 730, the user may be provided the option to select one or more friends to the chat group. The exemplary invitation window 760 of FIG. 7C may be shown to the invited friend. By receiving user input for the selection "Join" on invitation window 760, video client 140 may present to the user a the chat group screen of FIG. 7B, allowing the invited friend to participate in the chat group. Alternatively, video client may remove invitation window 760 if user input for the selection "No Thanks" is received.

In contrast with FIG. 7B, FIG. 7D provides an exemplary diagram of a chat group screen presentation that does not include a dedicated advertising space. Instead, targeted advertising for the chat group may be incorporated into the advertising sequence of broadcast programming. For example, instead of a local commercial that would be broadcast to most viewers in the region, users of the chat group may receive a targeted commercial 770 relevant to the group profile. In other implementations, the dedicated advertising space of FIG. 7B and the use of commercial time slots of FIG. 7D may be used together. Also as shown in FIG. 7D, a separate text entry area 780 may be provided to supplement chat space 740. Furthermore, in an alternative implementation as shown in FIG. 7D, remote control 710 may include a full QWERTY-style keypad.

The illustrations of FIGS. 7A-7D are exemplary formats for presenting a chat group screen. Other formats may be used. Additional and/or alternative, formats and techniques may be used to implement chat-related information, such as data scrolls and/or start-up screens.

Figure 8A:
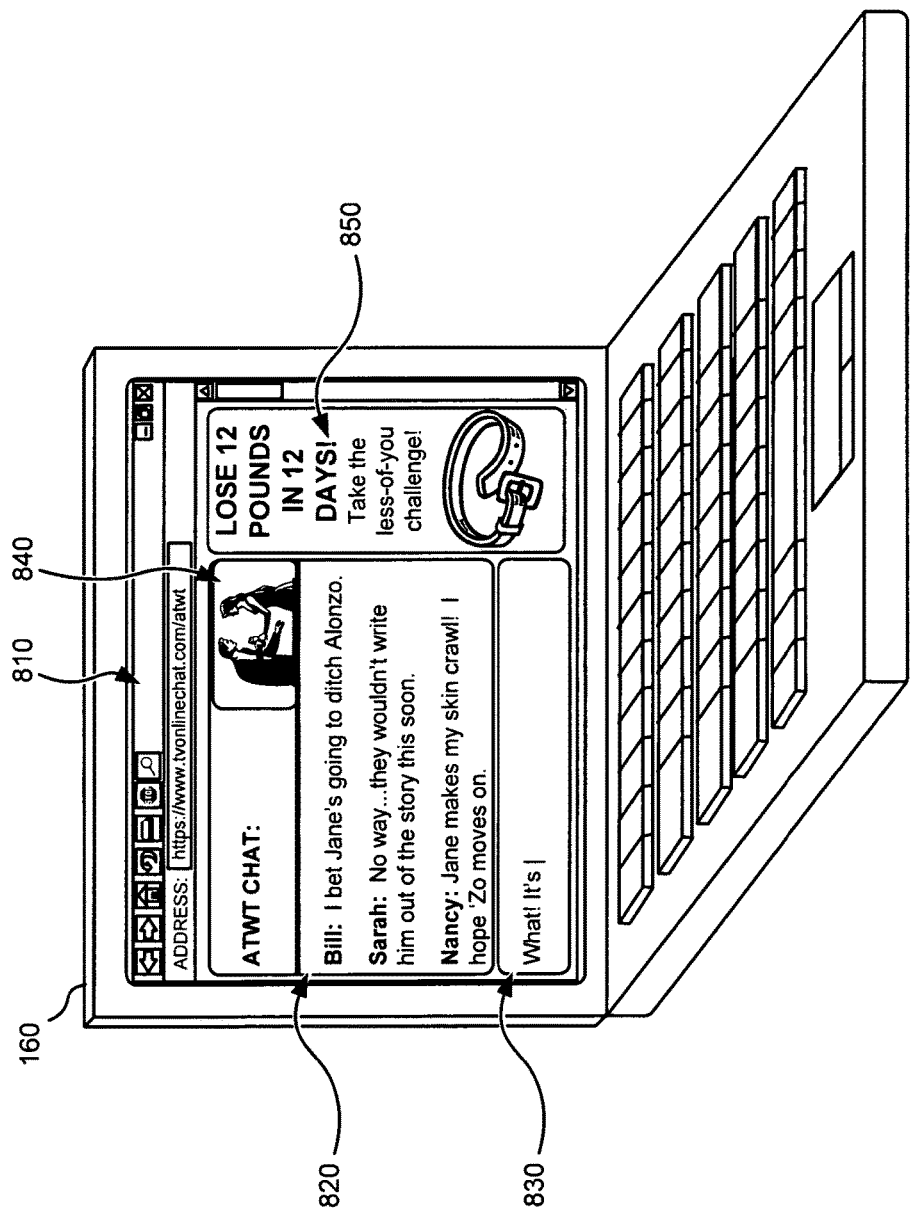
FIGS. 8A and 8B are exemplary diagrams illustrating implementations of computer-based customer interfaces for a chat-based micro-group.
Figure 8B:
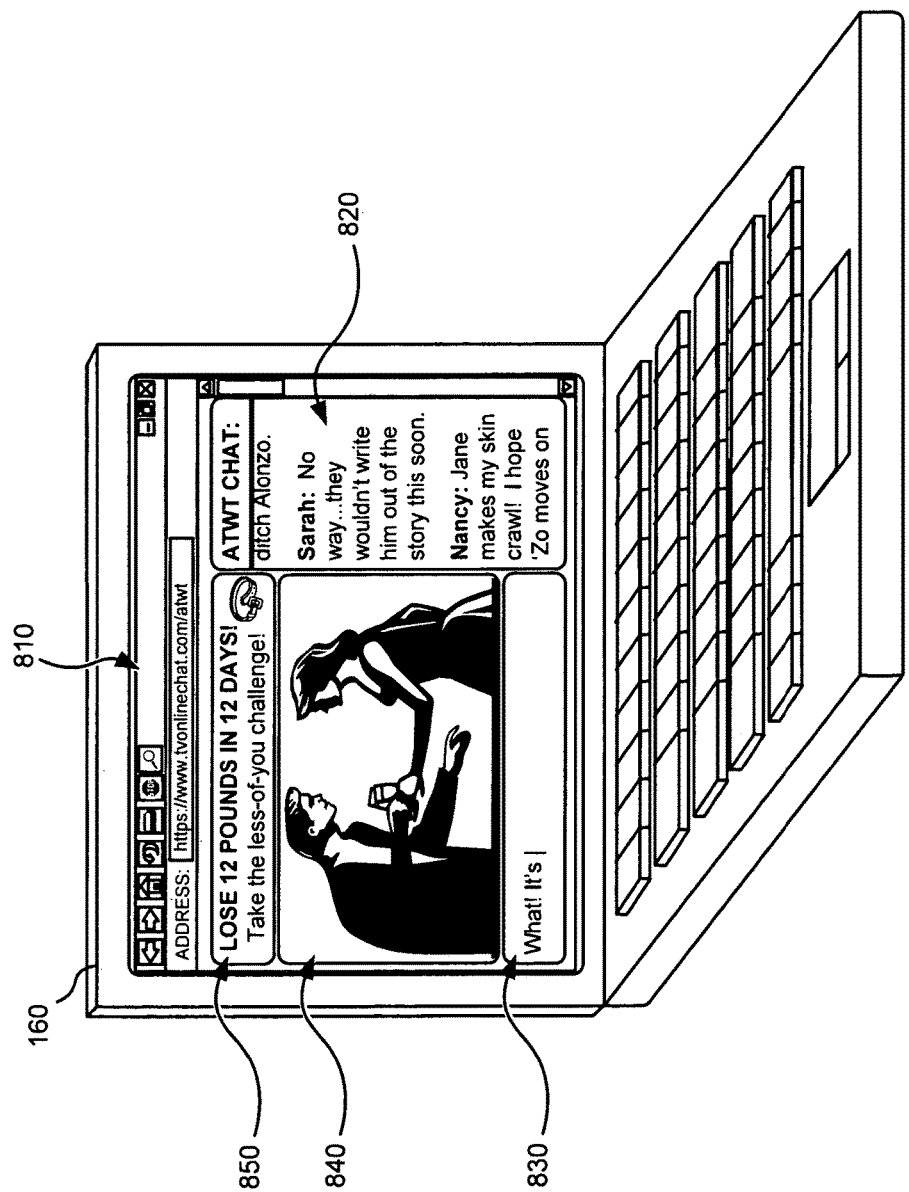

FIGS. 8A and 8B provide exemplary diagrams illustrating implementations of computer-based customer interfaces for a chat-based micro-group. FIG. 8A provides an exemplary diagram of a chat group screen presentation that may be used to accompany viewing of broadcast programming content on a television display. FIG. 8B provides an exemplary diagram of a chat group screen presentation that integrates broadcast programming content.

Referring to FIG. 8A, a user may view a program on a display device (e.g., display device 150, not shown) while using a computing device 160 to interact with a chat group. Using, for example, a web browser within computing device 160, a user may open browser window 810 to access a chat group web page. Access to the web page may, for example, be restricted to those with a login account that may be associated with a user's subscription television service account.

Browser window 810 in FIG. 8A may include a multi-panel display that has chat space 820, text entry space 830, program content 840, and dedicated advertising space 850. Chat space 820 may include dialogue text of friends in the chat group (e.g., Bill, Sarah, and Nancy). Text entry space 830 may include space for user input which may be provided via a keyboard or other user interface of computing device 160. Program content 840 may optionally be included to show streaming video or still images of a particular broadcast program. Dedicated advertising space 850 may include advertising content that has been identified (e.g., by micro-group manager 400) as applicable to the chat room participants. Dedicated advertising space 850 may include for example, any multimedia content provided via Internet Protocol (IP). Information in dedicated advertising space 850 may change at certain time intervals and/or when a presence indication (e.g., a mouse click, text entry, etc.) is received from a user.

In one implementation, server devices 110 (e.g., micro-group manager 400) may use web page login information to associate the chat group users with particular video clients 140. Thus, advertising shown on each display device 150 may be targeted for the chat group users as described above.

Referring to FIG. 8B, a user may view a program and interact with a chat group using a computing device 160. Using, for example, a web browser within computing device 160, a user may open browser window 810 to access program content 840. Browser window may also include chat space 820, text entry space 830, and dedicated advertising space 850 as described above with respect to FIG. 8A. Access to the web page may, for example, be restricted to those with a login account that may be associated with a user's subscription television service account. Thus, advertising shown in program content 840 may be targeted for the chat group users as described above.

Systems and/or methods described herein may be used to provide targeted advertising to user group in a subscription television service. Micro-groups of user accounts may be defined based on, for example, current participation in a chat group or information from user account profiles. A micro-group profile may be defined based on the individual user account profiles, the micro-group profile including common traits among the individual user accounts. Advertising corresponding to one of the common traits may be obtained and sent to computing devices associated with each of the user accounts within the micro-group.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flowchart of FIG. 5, the order of the blocks may differ in other implementations. Further, non-dependent blocks may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    providing, by one or more devices, broadcast programming to a plurality of user devices, associated with a plurality of users, via a television network;
    hosting, by the one or more devices, at least one chat group associated with the broadcast programming provided via the television network,
        hosting the at least one chat group including hosting a virtual chat room for the chat group that provides interaction via at least one of text-based discussion or a video client,
        the at least one chat group being displayed with the broadcast programming;
    determining, by the one or more devices and based on hosting the at least one chat group, information identifying a group of users, of the plurality of users, currently in a same chat group, of the at least one chat group, associated with the broadcast programming provided via the television network;
    defining, by the one or more devices, a micro-group to include user accounts associated with the group of users in the same chat group,
        the user accounts being added to the micro-group based on the group of users joining and currently being in the same chat group associated with the broadcast programming;
    creating, by the one or more devices, a profile associated with the micro-group based on user information associated with the user accounts;
    monitoring, by the one or more devices and based on hosting the at least one chat group, real time behavior of the group of users in the same chat group to detect one or more actions taken by one or more users of the group of users,
        the one or more actions being associated with content of the chat group;
    modifying, by the one or more devices, the profile associated with the micro-group based on the one or more actions;
    retrieving, by the one or more devices, advertising content targeted to the group of users in the same chat group based on the profile that is created based on the user information associated with the user accounts of the group of users in the same chat group and that is modified based on the one or more actions taken by the one or more users of the group of users in the same chat group; and
    providing, by the one or more devices, the advertising content to user devices, of the plurality of user devices, associated with users currently in the chat group,
        the advertising content being displayed in a same view as the chat group and being integrated into a television program included in the broadcast programming provided to the group of users in the same chat group.

2. The method of claim 1, where the advertising content is configured to be integrated into a designated time slot within the television program included in the broadcast programming.

3. The method of claim 1, where providing the advertising content includes:
    inserting the advertising content into a first time slot of an advertising sequence associated with the broadcast programming,
        the advertising content being configured to be displayed simultaneously with the television program included in the broadcast programming during the first time slot.

4. The method of claim 1, where defining the micro-group comprises:
    identifying the user accounts associated with the chat group; and
    determining common tendencies between a user profile for each user account of the user accounts.

5. The method of claim 1, where monitoring the real time behavior of the group of users in the same chat group includes:
    receiving information identifying a search conducted by the user, using one or more terms included in the advertising content,
        the search being conducted within a particular period of time after the advertising content is provided to the user device associated with the user account.

6. The method of claim 1, where the one or more actions include selecting a link included in the advertising content.

7. The method of claim 1, where the advertising content is included in a digital television signal.

8. The method of claim 1, where the advertising content is provided via Internet Protocol.

9. A device, comprising:
    a memory to store instructions; and
    a processor to execute the instructions to:

provide a program to a plurality of devices, associated with a plurality of users, via a subscription television network;
host at least one chat group associated with the program provided via the subscription television network,
the processor, when hosting the at least one chat group, is to host a virtual chat room for the chat group that provides interaction via at least one of text-based discussion or a video client,
the at least one chat group being displayed with the program,
receive information identifying a group of users, of the plurality of users, currently in a same chat group, of the at least one chat group, and accessing the program provided via the subscription television network,
define a micro-group to include user accounts associated with the group of users,
the user accounts being added to the micro-group based on the group of users currently being in the same chat group while accessing the program,
determine a profile for the micro-group, the profile being determined based on user account data included in the user accounts,
monitor, based on the chat group being hosted by the processor, real time behavior of the group of users in the same chat group to detect one or more actions taken by one or more users of the group of users,
the one or more actions being associated with a content of the chat group;
modify the profile associated with the micro-group based on the one or more actions,
obtain advertising content targeted to the group of users in the same chat group based on the profile that is created based on the user account data included in the user accounts of the group of users in the same chat group and that is modified based on the one or more actions taken by the one or more users of the group of users in the same chat group, and
send the advertising content to devices associated with users currently in the chat group,
the advertising content being displayed in a same view as the chat group and being integrated into the program provided to the group of users in the same chat group.

10. The device of claim 9, where the advertising content is presented for display simultaneously with the program.

11. The device of claim 9,
where, when identifying the micro-group, the processor is to execute the instructions to:
associate the user accounts with the chat group; and
determine common tendencies associated with the chat group based on the user accounts being associated with the chat group;
where the profile is determined based on the common tendencies.

12. The device of claim 9, where the processor is to execute the instructions further to:
receive information identifying a search conducted by the user, the search including one or more terms included in the advertising content; and
where the profile is modified further based on the information identifying the search.

13. The device of claim 9, where the processor is to execute the instructions further to:
receive information identifying a selection of a link, included in the advertising content, by the user; and where the profile is modified further based on the information identifying the selection of the link.

14. The device of claim 9, where the processor is to execute the instructions further to:
collect, from at least one of the devices associated with users currently in the chat group, user response data associated with one or more user actions conducted based on the advertising content being sent to the at least one of the devices, and
where the profile is modified further based on the user response data.

15. The device of claim 9, where, when sending the advertising content to the devices associated with the user accounts, the processor is to execute the instructions to:
replace first advertising content included in a first time slot of an advertising sequence associated with the program with the advertising content.

16. The device of claim 15, where, when sending the advertising content to the devices associated with the user accounts, the processor is to execute the instructions to:
provide the program, including the advertising sequence including the advertising content in the first time slot, to the devices associated with the user accounts, and
provide the program, including the advertising sequence including the first advertising content included in the first time slot to another device that is not associated with the user accounts.

17. A method, comprising:
providing, by a network device, broadcast programming to a plurality of devices, associated with a group of users, via a television network,
the broadcast programming including a plurality of television programs;
hosting, by the network device, at least one chat group associated with the broadcast programming provided via the television network,
hosting the at least one chat group including hosting a virtual chat room for the chat group that provides interaction via at least one of text-based discussion or a video client,
the at least one chat group being displayed with at least one of the plurality of television programs;
defining, by the network device, a micro-group to include user accounts associated with the group of users in a same chat group,
the user accounts being added to the micro-group based on the group of users joining the same chat group, associated with a same television program of the plurality of television programs, and being in the same chat group at a same time;
determining, by the network device, one or more characteristics common to each of the users of the group of users based on profile information included in the user accounts;
defining, by the network device, a profile for the micro-group based on the one or more characteristics;
monitoring, by the network device and based on hosting the at least one chat group, real time behavior of the group of users in the same chat group to detect one or more actions taken by one or more users of the group of users,
the one or more actions being associated with content of the chat group;
modifying, by the network device, the profile for the micro-group based on the one or more actions;
obtaining, by the network device, advertising content targeted to the group of users in the same chat group based on the profile that is determined based on the profile information included in the user accounts of the group of users in the same chat group and that is modified based on the one or more actions taken by the one or more users of the group of users in the same chat group; and sending, by the network device, the advertising content to computing devices associated with each of the user accounts,
- the advertising content being displayed in a same view as the chat group and being integrated into the broadcast programming provided to the group of users in the same chat group.

18. The method of claim 17, where sending the advertising content comprises:

sending the advertising content to video clients associated with each of the user accounts within the micro-group.

19. A non-transitory computer-readable medium storing instructions, the instructions comprising:

one or more instructions that, when executed by one or more processors, cause the one or more processors to:
- provide broadcast programming to a plurality of devices, associated with a plurality of users, via a subscription television network, the broadcast programming including a plurality of programs;
- host at least one chat group associated with the broadcast programming provided via the subscription television network by hosting a virtual chat room for the chat group that provides interaction via at least one of text-based discussion or a video client,
  - the at least one chat group being displayed with at least one of the plurality of programs;
- receive, based on hosting the at least one chat group, information identifying a group of users, of the plurality of users, currently in a same chat group, of the at least one chat group, and accessing a program, of the plurality of programs, provided via the subscription television network;
- define a micro-group to include user accounts associated with the group of users in the same chat group,
  - the user accounts being added to the micro-group based on the group of users joining the same chat group and being in the same chat group at a same time;
- identify a common trait among the user accounts of the micro-group;
- monitor, based on hosting the at least one chat group, real time behavior of the group of users in the same chat group to detect one or more actions taken by one or more users of the group of users,
  - the one or more actions being associated with content of the chat group,
- modify the micro-group based on the one or more actions,
  - the common trait changing based on the micro-group being modified,
- obtain advertising content targeted to the micro-group based on modifying the micro-group based on the one or more actions taken by the one or more users of the group of users in the same chat group; and
- send the advertising content to a devices associated with the user accounts,
  - the advertising content being displayed in a same view as the chat group and being integrated into the broadcast programming provided to the group of users in the same chat group.

20. The non-transitory computer-readable medium of claim 19, where the advertising content is inserted into a designated time slot of an advertising sequence associated with the program.

* * * * *